United States Patent
Schultz et al.

(10) Patent No.: US 8,054,988 B2
(45) Date of Patent: Nov. 8, 2011

(54) COMMUNICATIONS DEVICE FOR TRANSMITTING ACOUSTIC SIGNALS IN A MOTOR VEHICLE

(75) Inventors: Juergen Schultz, Lehre (DE); Volkmar Schoening, Wedemark (DE); Tobias Boehm, Velpke (DE); Stefan Matulovic, Ruehen (DE)

(73) Assignee: Volkswagen AG, Wolfsburg (DE)

( * ) Notice: Subject to any disclaimer, the term of this patent is extended or adjusted under 35 U.S.C. 154(b) by 273 days.

(21) Appl. No.: 10/511,617

(22) PCT Filed: Mar. 7, 2003

(86) PCT No.: PCT/EP03/02368
§ 371 (c)(1),
(2), (4) Date: Aug. 15, 2005

(87) PCT Pub. No.: WO03/088637
PCT Pub. Date: Oct. 23, 2003

(65) Prior Publication Data
US 2006/0023892 A1    Feb. 2, 2006

(30) Foreign Application Priority Data
Apr. 18, 1920   (DE) .................................. 102 17 778

(51) Int. Cl.
*H04B 1/00*      (2006.01)
*H04R 3/00*      (2006.01)
*H03G 3/00*      (2006.01)

(52) U.S. Cl. ............ 381/86; 381/92; 381/111; 381/122; 381/107

(58) Field of Classification Search .................... 381/86, 381/91, 92, 111, 122, 102–109
See application file for complete search history.

(56) References Cited

U.S. PATENT DOCUMENTS

| | | | | |
|---|---|---|---|---|
| 3,755,625 A | * | 8/1973 | Maston | ..................... 379/206.01 |
| 4,449,238 A | * | 5/1984 | Lee et al. | ..................... 381/110 |
| 4,965,833 A | * | 10/1990 | McGregor et al. | ............... 381/83 |
| 5,185,803 A | | 2/1993 | Moyski et al. | |
| 6,041,127 A | * | 3/2000 | Elko | ............................... 381/92 |
| 6,243,683 B1 | | 6/2001 | Peters | |
| 6,424,720 B1 | * | 7/2002 | Thomas et al. | .................. 381/66 |
| 6,496,581 B1 | | 12/2002 | Finn et al. | |
| 6,535,609 B1 | | 3/2003 | Finn et al. | |
| 6,748,088 B1 | | 6/2004 | Schaaf | |
| 7,280,583 B1 | | 10/2007 | Kowalewski et al. | |
| 7,415,116 B1 | | 8/2008 | Fels | |

FOREIGN PATENT DOCUMENTS

| | | |
|---|---|---|
| CA | 2 391 797 | 6/2001 |
| DE | 0 304 257 | 2/1989 |
| DE | 198 12 697 | 9/1999 |
| DE | 198 27 134 | 11/1999 |
| DE | 199 38 158 | 1/2001 |
| DE | 199 58 836 | 5/2001 |
| DE | 199 62 218 | 7/2001 |

(Continued)

*Primary Examiner* — Devona Faulk
(74) *Attorney, Agent, or Firm* — Kenyon & Kenyon LLP

(57) ABSTRACT

A communications device is for transmitting acoustic signals in a motor vehicle. The communications device includes at least two transmitters and at least two receivers for transmitting and emitting acoustic signals. One transmitter and one receiver are each allocated to a spatial position. The device further includes a control unit for activating or deactivating at least the transmitters. The control unit is associated with at least one actuator element by which at least one transmitter may be selectively deactivated irrespective of a prevailing signal level.

14 Claims, 1 Drawing Sheet

FOREIGN PATENT DOCUMENTS

| | | |
|---|---|---|
| EP | 0 304 257 | 2/1989 |
| EP | 0 903 726 | 3/1999 |
| EP | 1 243 079 | 9/2002 |
| FR | 27 72 964 | 6/1999 |
| JP | 10032898 A * | 2/1998 |
| JP | 2002-502576 | 1/2002 |
| WO | WO 9949698 A1 * | 9/1999 |
| WO | WO 01/41499 | 6/2001 |

\* cited by examiner

COMMUNICATIONS DEVICE FOR TRANSMITTING ACOUSTIC SIGNALS IN A MOTOR VEHICLE

FIELD OF THE INVENTION

The present invention relates to a communications device for transmitting acoustic signals in a motor vehicle.

BACKGROUND INFORMATION

Such devices, for example DVE (digital voice enhancement) systems, have the task of improving the acoustic communication between users, or the acoustic communication of users with an acoustic interface, such as a voice-recognition system or a handsfree telephone system, in a space. In addition to engine and wind noise, communication may be impeded by overly intense damping of individual, spatial, acoustic transmission routes. To this end, the devices include different microphones and loudspeakers, which are assigned to specific spatial positions. Instead of individual microphones, microphone arrays are also conventional, the microphones of which are aligned with the respective spatial positions.

German Published Patent Application No. 199 38 158 describes a device for compensating for losses of an acoustic signal on a transmission path between at least one transmitting location and least one receiving location in a space, a control unit being provided for determining the transmission path and ascertaining at least one parameter of a corresponding transfer function, and the control unit being connected to at least one level balance or automatic gain control, which, in combination with at least one echo compensator, is positioned between the transmitting location and the receiving location for controlling the acoustic signal level for a specifiable position in the transmission path. In this context, the microphone having the highest signal level is determined by the control unit. In each instance, this microphone represents the active microphone. Its assigned loudspeaker is deactivated. The electrical signals from the active microphone to the active loudspeakers are temporally delayed, so that these are synchronous with respect to the acoustic signal path. In addition, they should be attenuated as a function of the position of the loudspeakers, so that the sum of acoustic and electrical signals yields a predefined sound level at the specific spatial positions.

SUMMARY

According to an example embodiment of the present invention, a communications device for transmitting acoustic signals may be provided in which certain interfering acoustic signals may be more effectively suppressed.

To this end, the control unit is assigned at least one control element, by which at least one transmitting device may be selectively deactivated independently of the applied signal level. In this context, for example, screaming children may markedly deteriorate the communication between the vehicle occupants or between a vehicle occupant and terminal equipment. If all of the transmitting devices are active, these noises are also transmitted and interfere with the acoustic perceptibility of the other vehicle occupants. If only the transmitting device of the loudest vehicle occupant is active, this may even result in only the shouting of children being transmitted. An example embodiment of the present invention may provide the option of selectively deactivating the corresponding transmitting device, so that acoustic signals from this spatial position are no longer transmitted by the communications device. In addition, it is also possible to weight the signal levels for selecting the active transmitting device, e.g., in order to compensate for the very loud or very soft talking of a vehicle occupant, so that complete deactivation may optionally be dispensed with. If, for example, the signal level of the transmitting device assigned to the small child is then assigned a weighting factor of 0.1, then the transmitting device of the small child is only activated, when the signal level attenuated by $1/10$ is still the highest signal level. Then, the transmission to the receiving devices may take place, taking the weighting factors into consideration, so that the signals of people talking very loud are attenuated and the signals of people speaking very softly are amplified. In this context, the weighting of the signal levels may be carried out both in example embodiments where, in each instance, only the transmitting device having the highest signal level is activated, and in example embodiments where, in each instance, all of the transmitting devices are active.

In an example embodiment, individual receiving devices may also be selectively deactivated independently of the signal levels applied to the corresponding transmitting devices. Therefore, a seating position may, for example, be completely excluded from the communications device, so that, for example, a sleeping passenger is not disturbed.

The transmitting devices may take the form of microphones and/or a microphone array, the receiving devices, e.g., taking the form of loudspeakers.

In an example embodiment, only the transmitting device or microphone having the highest signal level is activated in each instance, the respectively assigned receiving device of the active transmitting device being deactivated in order to minimize feedback or echoes.

In an example embodiment, time-delay elements for compensating for the propagation-time differences are positioned between the transmitting and receiving devices, in order to emit the acoustic signal at the receiving device synchronously to the acoustic space wave. In this context, the propagation times may be determined in advance and stored in the control unit as a priori information.

In an example embodiment, echo compensators are positioned between the transmitting and receiving devices, reference being made, for example, to an arrangement described in German Published Patent Application No. 199 38 158.

In order to compensate for the different attenuations between the different seating positions in a motor vehicle, as well as compensate for the different attenuations as a function of the transmission direction, attenuating units are arranged between the transmitting and receiving units, so that the signal levels emitted by the receiving units are adjustable such that superposition with the acoustic space wave may yield a constant signal level.

In this context, the arrangement of the control element may vary considerably. For example, each transmitting and receiving device may be assigned a nonlocking key or switch, by which the transmitting and/or receiving device may be deactivated or further linked to the communications device. In order to reduce the number of control elements, a seating position may be assigned, in each instance, a control element, by which all of the transmitting and receiving devices assigned to the seating position may be deactivated. To dispense with separate control elements for the different seating positions, a rotary/pressure transducer, which is assigned, e.g., a display or a LED indicator, may be used, so that the seating positions may be selected by rotation and the transmitting and/or receiving devices of the seating positions may then be deactivated or reconnected by pressing.

In an example embodiment, the communications device is operated via a multifunction operating device, where an appropriate menu is then displayable and the transmitting and/or receiving devices are deactivated or reconnected via the control elements of the multifunction operating device, which are present as it is. In this context, the control element may take the form of a rotary/pressure transducer, rocker switch, nonlocking key, or softkey, etc., depending on the design of the multifunction operating device.

BRIEF DESCRIPTION OF THE DRAWING

The FIGURE illustrates a schematic block diagram of a communications device in a motor vehicle.

DETAILED DESCRIPTION

Figure 1:
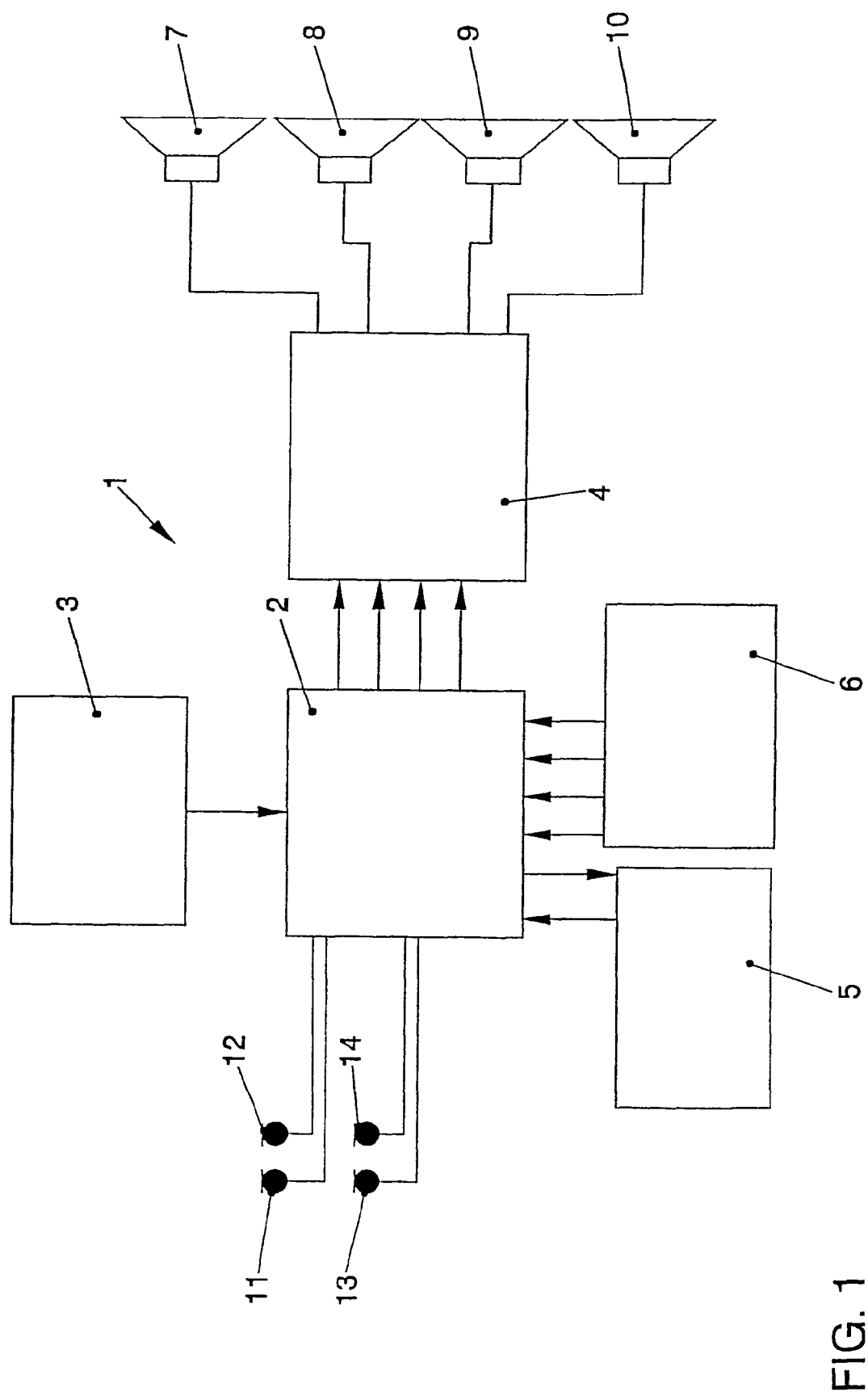

Communications device 1 includes a control unit 2, a control element 3, an amplifier 4, a telephone system 5 having handsfree telephone equipment, a radio 6, four loudspeakers 7 to 10, as well as four microphones 11 to 14, which are each assigned to a seating position in the motor vehicle. Loudspeakers 7 to 10 are arranged, for example, on the left and the right, in the front and the rear of the motor vehicle and are controlled by control unit 2 via amplifier 4, the signals of both radio 6 and telephone system 5 being able to be emitted via loudspeakers 7 to 10. Microphones 11 to 14 are assigned to different seating positions in the motor vehicle, e.g., microphone 11 being assigned to the driver, microphone 12 being assigned to the front-seat passenger, and microphones 13, 14 being assigned to the rear-seat bench (on the left and right). An acoustic signal of a vehicle occupant may then be picked up by microphones 11 to 14 and transmitted to control unit 2, where the signal may then be output by loudspeakers 7 to 10, via amplifier 4. By this arrangement, communication between the vehicle occupants or between a vehicle occupant and terminal equipment such as telephone system 5, which may otherwise be impaired by vehicle noises or attenuation, may be improved. Therefore, using such a communications device 1, both the communication between the vehicle occupants in the front and rear of the motor vehicle may be improved, and the use of handsfree telephone systems, e.g., by the vehicle occupants sitting on the rear bench, is rendered possible. To this end, control unit 2 or a measuring device assigned to it determines the microphone or the alignment or orientation of the microphone array, at which the highest signal level is currently present. In this context, only a specific frequency range may be used for determining the signal level. In so doing, it is assumed that the corresponding vehicle occupant is speaking, so that his or her signals are output via loudspeakers 7 to 10, while the signals of the other microphones are suppressed. In order to prevent echoes, loudspeaker 7 to 10 assigned to the seating position is deactivated for the voice signal, so that the vehicle occupant does not hear his own voice from the loudspeaker, while at the same time, transmitted music continues to be emitted by radio 6.

Using control element 3, which is may be assigned to the driver, individual microphones 11 to 14 or groups of microphones may be deactivated. Individual loudspeakers 7 to 10 may be deactivated, as well. By this arrangement, individual seating positions, whose signals transmitted by the microphones may otherwise impair or hinder communication, may be selectively excluded from the communications device, such as in the case of screaming children, whose assigned microphone may otherwise always be switched to active, given a sufficient sound level.

What is claimed is:

1. A communications device for transmitting acoustic signals in a motor vehicle, comprising:
    at least two transmitter devices configured to transmit acoustic signals;
    at least two receiver devices configured to emit acoustic signals;
    a control unit configured to activate and deactivate at least the transmitter devices;
    wherein at least one transmitter device and at least one receiver device are assigned to a spatial position, the transmitter devices configured to detect signal levels in accordance with the control unit, the control unit assigned at least one control element configured to weight signal levels of at least one transmitter device to one of selectively attenuate and selectively amplify the signal level of each transmitter device in accordance with a respective weighting factor based on the weight, the control unit configured to activate only a transmitter device having a highest weighted signal level,
    wherein the at least one control element is a part of a multifunction operation unit configured to select the spatial position by one function of the multifunction operation unit, and configured to at least one of activate and deactivate at least one of the at least one transmitter device and the at least one receiver device assigned to the spatial position by another function of the multifunction operation unit.

2. The communications device according to claim 1, wherein the control element is configured to deactivate at least one receiver element independently of the signal levels.

3. The communications device according to claim 1, wherein the transmitter devices include at least one of (a) a microphone and (b) a microphone array.

4. The communications device according to claim 1, wherein the receiver devices include a loudspeaker.

5. The communications device according to claim 1, wherein the control unit is configured to one of (a) deactivate an assigned receiver device of an active transmitter device and (b) reduce a level of the assigned receiver device of the active transmitter device.

6. The communications device according to claim 1, further comprising time-delay elements configured to compensate for differences in propagation time arranged between the transmitter devices and the receiver devices.

7. The communications device according to claim 1, further comprising echo compensators arranged between the transmitter devices and the receiver devices.

8. The communications device according to claim 1, further comprising attenuation devices arranged between the transmitter devices and the receiver devices.

9. The communications device according to claim 1, wherein the control element includes at least one of (a) a non-locking key, (b) a switch, (c) a rotary transducer and (d) a pressure transducer.

10. The communications device according to claim 1, wherein the multifunction operation unit is configured to indicate a position of the transmitter devices and the receiver devices, the control element assigned to the multifunction operation unit.

11. A communications device for transmitting acoustic signals in a motor vehicle, comprising:
    at least two transmitting means for transmitting acoustic signals;
    at least two receiving means for emitting acoustic signals;
    controlling means for activating and deactivating at least the transmitting means;

wherein at least one transmitting means and at least one receiving means are assigned to a spatial position, the transmitting means for detecting signal levels in accordance with the controlling means, the controlling means assigned at least one control element means for weighting signal levels of at least one transmitting means to one of selectively attenuate and selectively amplify the signal level of each transmitting means in accordance with a respective weighting factor based on the weight, the controlling means for activating only a transmitting means having a highest weighted signal level, wherein the at least one control element is a part of a multifunction operation unit configured to select the spatial position by one function of the multifunction operation unit, and configured to at least one of activate and deactivate at least one of the at least one transmitter device and the at least one receiver device assigned to the spatial position by another function of the multifunction operation unit.

12. The communications device according to claim 1, wherein the multifunction operation unit is configured to indicate seating positions corresponding to positions of the transmitter devices and receiver devices, the control element assigned to the multifunction operation unit.

13. The communications device according to claim 1, wherein the control unit is also configured to selectively deactivate at least one transmitter device independently of an applied signal level.

14. The communications device according to claim 11, wherein the at least one control element means is also for selectively deactivating at least one transmitting means independently of an applied signal level.

* * * * *